US009654442B2

(12) United States Patent
Tung

(10) Patent No.: US 9,654,442 B2
(45) Date of Patent: May 16, 2017

(54) METHODS FOR DEPLOYING CLUSTERED SERVERS AND APPARATUSES USING THE SAME

(71) Applicant: Wistron Corp., New Taipei (TW)

(72) Inventor: Kuang-Hao Tung, New Taipei (TW)

(73) Assignee: Wistron Corp., New Taipei (TW)

( * ) Notice: Subject to any disclaimer, the term of this patent is extended or adjusted under 35 U.S.C. 154(b) by 459 days.

(21) Appl. No.: 14/170,540

(22) Filed: Jan. 31, 2014

(65) Prior Publication Data

US 2015/0156067 A1  Jun. 4, 2015

(30) Foreign Application Priority Data

Dec. 2, 2013  (TW) .............................. 102143986 A

(51) Int. Cl.
- *G06F 15/16* (2006.01)
- *H04L 29/12* (2006.01)
- *H04L 12/24* (2006.01)

(52) U.S. Cl.
CPC ...... *H04L 61/2015* (2013.01); *H04L 41/0806* (2013.01)

(58) Field of Classification Search
CPC ..................... H04L 61/2015; H04L 41/0806
USPC ....................................................... 709/209
See application file for complete search history.

(56) References Cited

U.S. PATENT DOCUMENTS

| | | | |
|---|---|---|---|
| 7,051,089 B1 * | 5/2006 | Johnson | H04L 29/12273 709/220 |
| 7,882,217 B2 | 2/2011 | Katzir | |
| 2002/0062377 A1 * | 5/2002 | Hillman | H04L 29/06 709/227 |
| 2002/0120706 A1 * | 8/2002 | Murphy | H04L 29/06 709/208 |
| 2003/0158886 A1 * | 8/2003 | Walls | G06F 3/14 709/201 |
| 2006/0259539 A1 * | 11/2006 | Martikian | H04L 12/66 709/202 |
| 2008/0056130 A1 * | 3/2008 | Desai | H04L 12/2801 370/231 |
| 2010/0191839 A1 * | 7/2010 | Gandhewar | H04L 29/12028 709/220 |
| 2010/0312875 A1 * | 12/2010 | Wilerson | H04L 29/12066 709/224 |
| 2011/0030032 A1 * | 2/2011 | Baykal | H04L 29/12264 726/3 |
| 2012/0011230 A1 * | 1/2012 | Moreman | H04L 61/2015 709/220 |

(Continued)

*Primary Examiner* — Kevin Bates
*Assistant Examiner* — Ronak Patel

(57) ABSTRACT

An embodiment of the invention introduces a method for deploying clustered servers, executed by a processing unit of a DHCP (Dynamic Host Configuration Protocol) server, which contains at least the following steps. Deployment information associated with a requesting server is encapsulated into an acknowledgement after the DHCP server receives a request from the requesting server, where the request requests an IP (Internet Protocol) address, which has been assigned by the DHCP server. The acknowledgement is replied to the requesting server, thereby enabling the requesting server to configure itself as a master server or a slave server in a cloud computing environment according to the deployment information of the acknowledgement.

13 Claims, 6 Drawing Sheets

(56) References Cited

U.S. PATENT DOCUMENTS

| | | | |
|---|---|---|---|
| 2012/0215874 A1* | 8/2012 | Sequeira | H04L 12/12 709/208 |
| 2013/0080614 A1 | 3/2013 | Iyer | |
| 2014/0304393 A1* | 10/2014 | Annamalaisami | H04L 43/04 709/224 |
| 2015/0052522 A1* | 2/2015 | Chanda | G06F 9/455 718/1 |

* cited by examiner

METHODS FOR DEPLOYING CLUSTERED SERVERS AND APPARATUSES USING THE SAME

CROSS REFERENCE TO RELATED APPLICATIONS

This Application claims priority of Taiwan Patent Application No. 102143986, filed on Dec. 2, 2013, the entirety of which is incorporated by reference herein.

BACKGROUND

Technical Field

The present invention relates to cloud computing, and in particular, to methods for deploying clustered servers and apparatuses using the same.

Description of the Related Art

Cloud computing is the technology providing a variety of computing capabilities that involve a number of computers connected through a communications networks, such as the Internet, a LAN (local area network), etc. It often requires the engineer to spend much time to deploy clustered servers manually. For example, the engineer has to configure each computer to have the capability of a master server, a slave server, a storage server, or any combination thereof. However, the routine manual operations can easily go wrong, and it may cause the cloud computing environment to fail to be successfully established. Thus, it is desirable to have methods for deploying clustered servers and apparatuses using the same to not only reduce the deployment time but also eliminate errors that happen during configuration.

BRIEF SUMMARY

An embodiment of the invention introduces a method for deploying clustered servers, executed by a processing unit of a DHCP (Dynamic Host Configuration Protocol) server, which contains at least the following steps. Deployment information associated with a requesting server is encapsulated into an acknowledgement after the DHCP server receives a request from the requesting server, where the request requests an IP (Internet Protocol) address, which has been assigned by the DHCP server. The acknowledgement is replied to the requesting server, thereby enabling the requesting server to configure itself as a master server or a slave server in a cloud computing environment according to the deployment information of the acknowledgement.

An embodiment of the invention introduces an apparatus for deploying clustered servers, which contains at least a communications interface and a processing unit. The processing unit, coupled to the communications interface, encapsulates deployment information associated with a requesting server into an acknowledgement after receiving a request from the requesting server through the communications interface, where the request requests an IP (Internet Protocol) address, which has been assigned by the DHCP server. The processing unit further replies with the acknowledgement to the requesting server through the communications interface, thereby enabling the requesting server to configure itself as a master server or a slave server in a cloud computing environment according to the deployment information of the acknowledgement.

An embodiment of the invention introduces a method for deploying clustered servers, executed by a processing unit of a server, which contains at least the following steps. Deployment information is obtained from an acknowledgement after receiving the acknowledgement from a DHCP server. The server is configured as a master server or a slave server in a cloud computing environment according to the deployment information of the acknowledgement.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
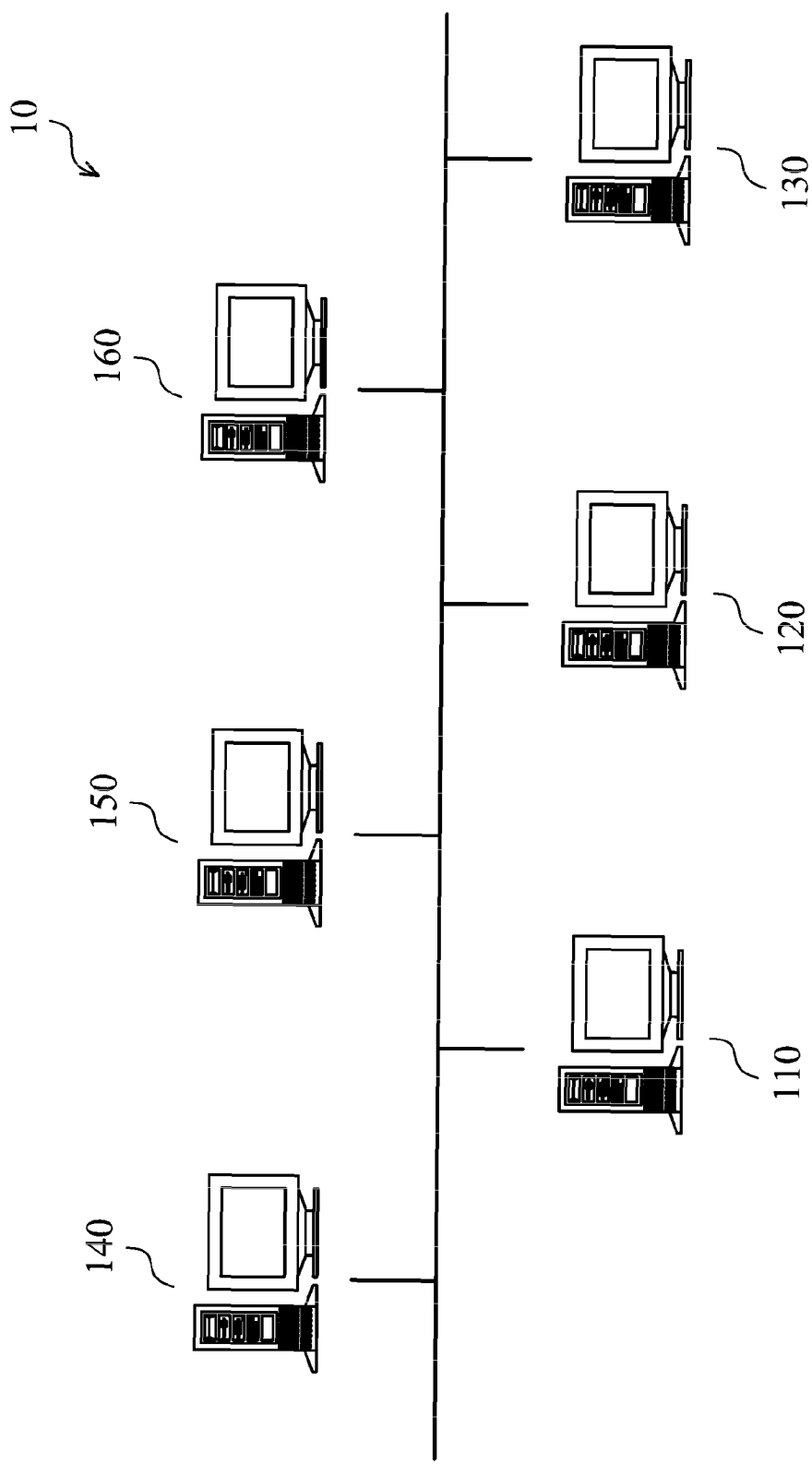
FIG. 1 is a schematic diagram of the network architecture according to an embodiment of the invention.

An embodiment of the invention introduces the network architecture containing multiple servers operating in a cloud computing environment. FIG. 1 is a schematic diagram of the network architecture according to an embodiment of the invention. The server 110 is the DHCP (Dynamic Host Configuration Protocol) server, used on IP (Internet Protocol) networks, dynamically configuring IP addresses and other information that is needed for IP network communications. DHCP allows other servers 120 to 160 to receive an IP address automatically from the DHCP server 110. The DHCP server 110 maintains a database of available IP addresses and other sorts of addresses, such as a default router address, and one or more DNS (domain name server) addresses. The server 120 is a master server in the cloud computing environment, providing at least two main procedures: "map" and "reduce". The servers 130 to 150 are slave servers in the cloud computing environment, while the server 160 is a storage server in the cloud computing environment. The master server 120, the slave servers 130 to 150, and the storage server 160 are collectively referred to as clustered servers operating in the cloud computing environment. Those skilled in the art may appreciate that the master server, the slave server, the storage server or any combination thereof may be practiced in a single computing apparatus physically, and the invention should not be limited thereto. In the map procedure, the master server 120 divides a task into smaller sub-tasks, and distributes them to slave servers 130 to 150 via the storage server 160. Each of the slave servers 130 to 150 processes the assigned sub-task, and stores the computation results to a designated location of the storage server 160. In the reduce procedure, the master server 120 then collects the computation results of the sub-tasks from the storage server 160 and combines them to form the output. In some embodiments, the master server 120 may divide a video file (.avi) of thirty seconds into three equal parts, and then distribute them to the slave servers 130 to 150. Each of the slave servers 130 to 150 performs a sub-task to transcode the video file (.avi) of ten seconds into another type of video file (.mp4). In other embodiments, the master server 120 may divide a global Web server task into three parts, and then distributes to the slave servers 130 to 150 to search Web pages in Asia, Europe and Africa, respectively.

Figure 2:
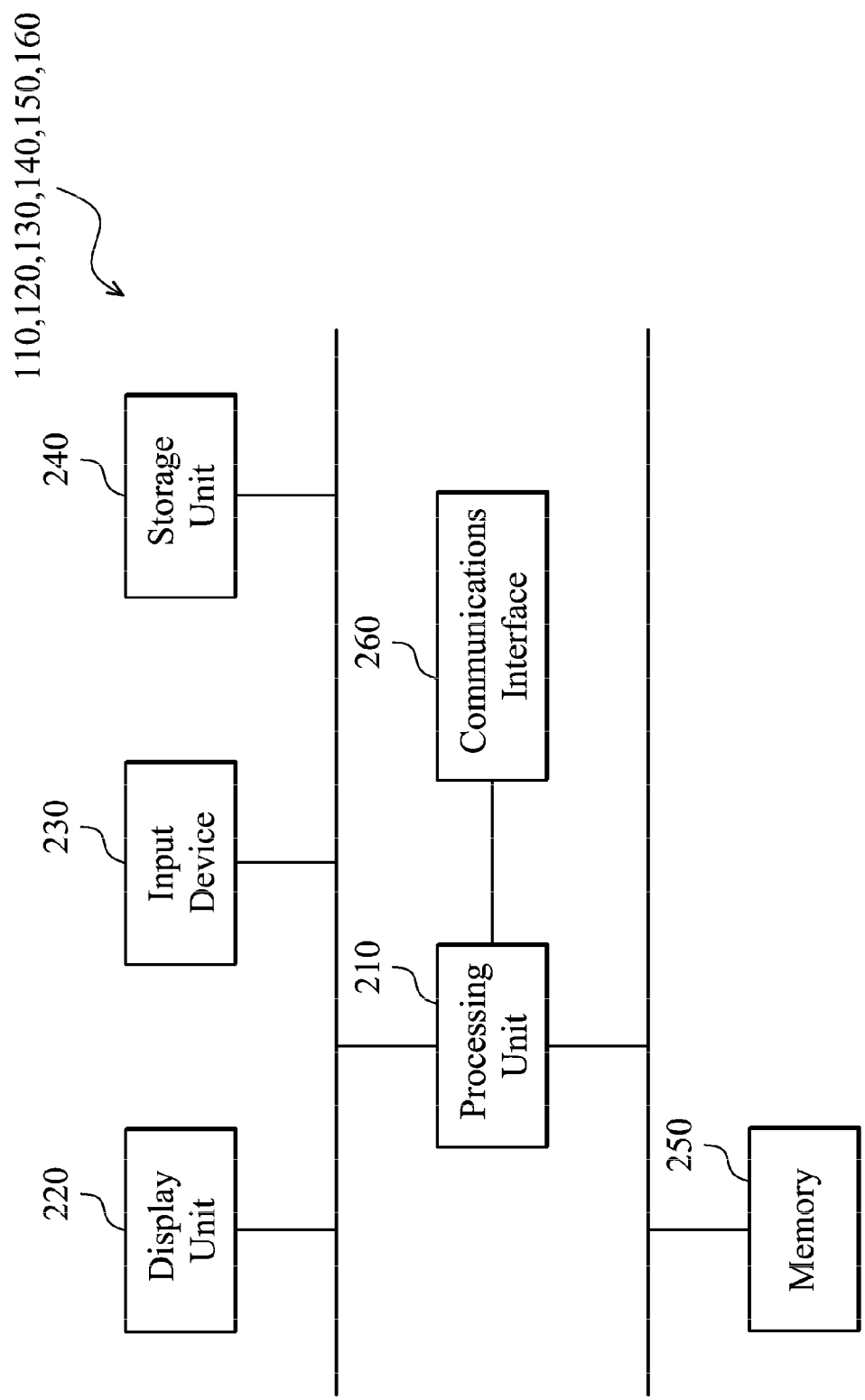
FIG. 2 is the system architecture of a server according to an embodiment of the invention.

FIG. 2 is the system architecture of a server according to an embodiment of the invention. The system architecture may be practiced in any of the DHCP server 110, the master server 120, the slave servers 130 to 150, and the storage server 160, at least including a processing unit 210. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 250 for storing necessary data in execution, such as variables, data tables, or others, and a storage unit 240 for storing a wide range of electronic files, such as Web pages, documents, video files, audio files, or others. A communications interface 260 is included in the system architecture and the processing unit 210 can communicate with other electronic devices thereby. The communications interface 260 may be a LAN (local area network) communications module, a WLAN (wireless local area network) communications module, a Bluetooth communications module, or others. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a one-click, a double-click, a single-finger dragging, and a multiple finger dragging. A display unit 220, such as a TFT-LCD (Thin film transistor liquid-crystal display) panel, an OLED (Organic Light-Emitting Diode) panel, or others, may also be included to display input letters, alphanumeric characters and symbols, dragged paths, drawings, or screens provided by an application for a user's viewing.

The DHCP server 110 stores a mapping table, which is employed to recognize whether a computing apparatus requesting an IP address is a clustered computer in the cloud computing environment, and if so, whether its type is the master, slave or storage server. The mapping table in a specific data structure may be stored in the storage unit 240 or the memory 250. An example of an initial mapping table is shown in table 1 as follows.

TABLE 1

| MAC address | Server Type | IP address Type | Assigned IP address |
|---|---|---|---|
| F0:DE:F1:40:37:91 | Master | Fixed | 192.168.1.100 |
| F0:DE:F1:40:37:92 | Slave | Floating | — |
| F0:DE:F1:40:37:93 | Slave | Floating | — |
| F0:DE:F1:40:37:94 | Slave | Floating | — |
| F0:DE:F1:40:37:95 | Storage | Fixed | 192.168.1.101 |

Figure 3:
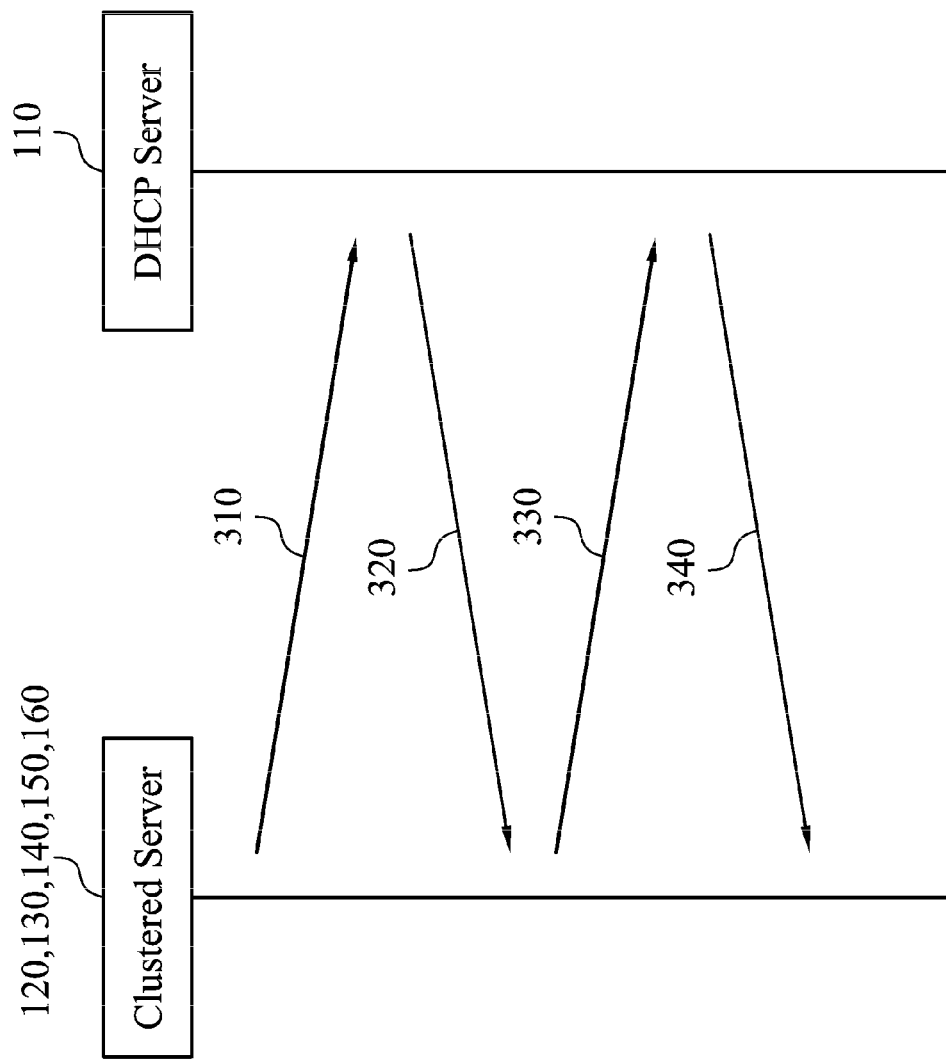
FIG. 3 is a schematic diagram illustrating the DHCP message exchange according to an embodiment of the invention.

The DHCP server 110 encapsulates deployment information in a message to be transmitted to the recognized server after receiving a DHCP request requesting an IP address from any of the master server 120, the slave servers 130 to 150 and the storage server 160, thereby enabling the requesting server to complete its configuration for the cloud computing environment according to the deployment information. FIG. 3 is a schematic diagram illustrating the DHCP message exchange according to an embodiment of the invention. Any of the clustered servers 120 to 160 may broadcast discovery messages DHCPDISCOVER 310 on the physical subnet to discover available DHCP servers. The MAC (Media Access Control) address of the broadcasting server is encapsulated in the CHADDR (Client Hardware Address) field of the broadcast discovery message 310. The DHCP server 110 may obtain an MAC address from the listened discovery message 310 and, by inspecting the mapping table, recognize whether the requesting apparatus with the obtained MAC address is a clustered computer in the cloud computing environment, and if so, whether its type is the master, slave or storage server. When recognizing that the requesting server is the master or storage server, the DHCP server 110 provides a predetermined IP address recorded in the mapping table. Alternatively, when recognizing that the requesting server is the slave server, the DHCP server 110 reserves an IP address from an available address range for the requesting server. The DHCP server 110 unicasts an offer message DHCPOFFER 320 to the requesting server. The offer message 320 contains the MAC address of requesting server, the IP address that the DHCP server 110 is offering, the subnet mask, the lease duration, and the IP address of the DHCP server 110 making the offer. The offered IP address is encapsulated in the YIADDR (Your IP Address) field. In response to the offer message 320, the requesting server replies with a request DHCPREQUEST 330, broadcast to the server, requesting the offered address. When the DHCP server 110 receives the request 330 from the requesting server, the deployment message exchange enters its final phase. The DHCP server 110 unicasts an acknowledgement DHCPACK 340 to the requesting server. The acknowledgement 340 includes deployment information associated with the requesting server. In addition, when receiving the request 330, the DHCP server 110 may record the offered address in the mapping table as shown in table 1. Details of deployment information and how the requesting server accordingly configures itself as the master, slave or storage server, or any combination thereof will be discussed in the following.

Figure 4:
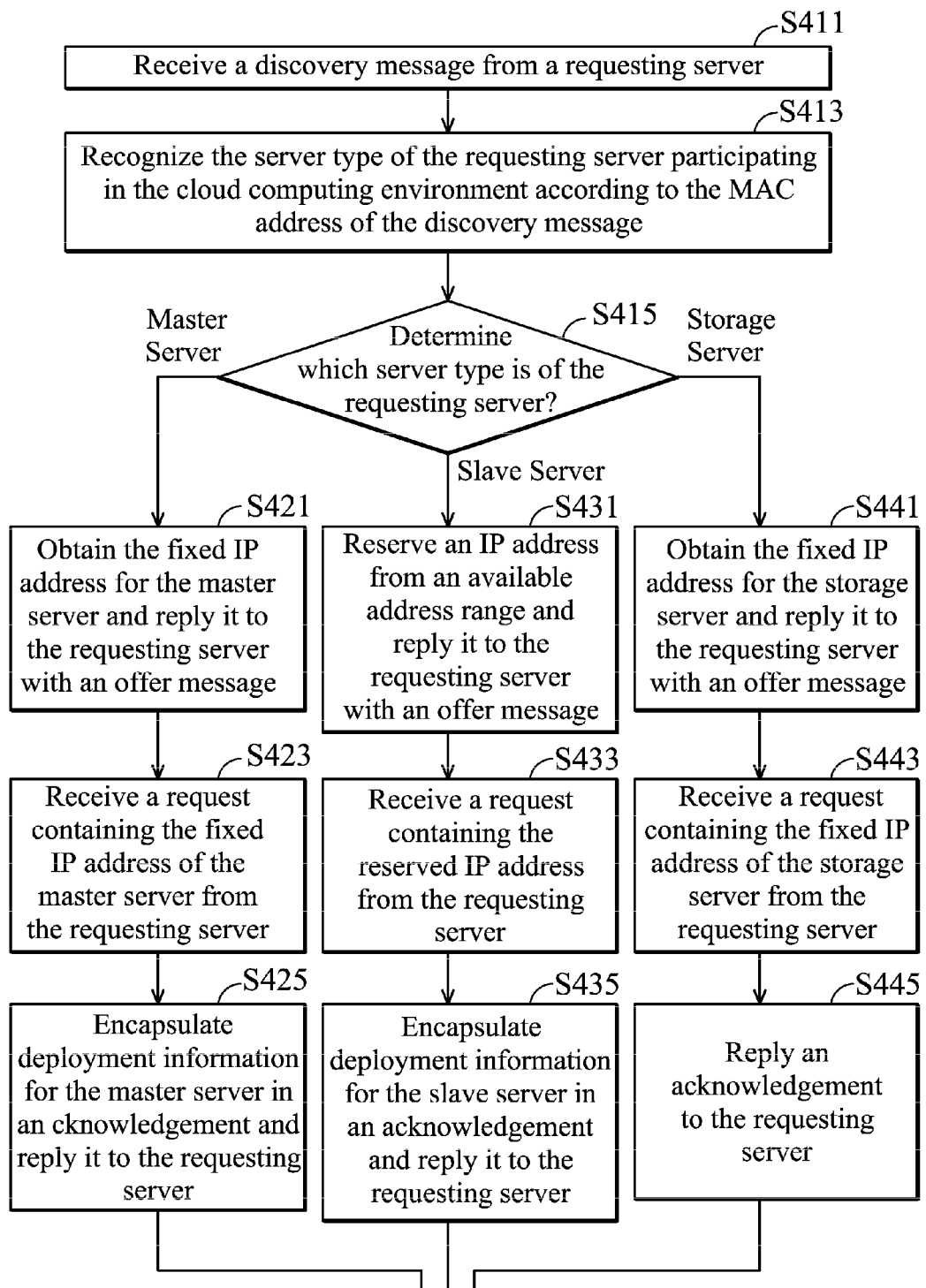
FIG. 4 is a flowchart illustrating a method for deploying clustered servers, executed in the DHCP server, according to an embodiment of the invention.

FIG. 4 is a flowchart illustrating a method for deploying clustered servers, executed in the DHCP server, according to an embodiment of the invention. Specifically, the method is performed when the processing unit 210 of the DHCP server 110 loads and executes relevant program codes. After receiving a discovery message 310 from a requesting server (step S411), the DHCP server 110 recognizes the server type of the requesting server participating in the cloud computing environment according to the MAC address of the discovery message 310 (step S413). The DHCP server 110 may recognize that the requesting server is the master, slave or storage server by inspecting the mapping table as shown in Table 1. When recognizing that the requesting server is the master server (the "master server" path of step S415), the fixed IP address for the master server is obtained and replied to the requesting server with an offer message 320 (step S421), where the fixed IP address for the master server may be recorded in the mapping table. Subsequently, when receiving a request 330 containing the fixed IP address of the master server from the requesting server (step S423), the DHCP server 110 encapsulates deployment information for the master server in an acknowledgement 340 and replies the acknowledgement 340 to the requesting server (step S425). An example of the deployment information for the master server is shown in table 2 as follows.

and those skilled in the art will understand that other undefined options can be used to carry the aforementioned deployment information. The value "Hdfs://192.168.1.101:9000" carried in the option "100" describes the location of the storage server 160, which is provided for the slave server(s) 130 to 150 to store working results when they execute the assigned sub-tasks. The value "http://192.168.1.101:8080" carried in the option "104" describes the location of the storage server 160, which is provided for the master server 120 to store the final results collected from the working results. The location "http://192.168.1.101:8080" is also provided to clients for accessing the final results. Values of the options "104", "105" and "106" are dedicated for configuring the master server.

When recognizing that the requesting server is the slave server (the "slave server" path of step S415), an IP address is reserved from an available address range and replied to the requesting server with an offer message (step S431). Subsequently, when receiving a request 330 containing the reserved IP address from the requesting server (step S433), the DHCP server 110 encapsulates deployment information for the slave server in an acknowledgement 340 and replies

TABLE 2

| Option | Length | Value | Description |
|---|---|---|---|
| 100 | n | Hdfs://192.168.1.101:9000 | The location of the storage server, which is provided for the slave server(s) to store working results. |
| 101 | n | /app/hadoop/tmp | The directory of the master server, which is provided to store temporarily files. |
| 102 | 1 | 1 | A designated number of copies being stored in the storage server. |
| 103 | n | 192.168.1.100:54311 | IP address and port number of the master server. |
| 104 | n | http://192.168.1.101:8080 | The location of the storage server, which is provided for the master server to store the final results. |
| 105 | n | admin | The account for logging in the storage server. |
| 106 | n | password | The password for logging in the storage server. |

Options 100 to 106 list ones, which are not defined in the DHCP specification but used to carry the deployment information of the master server. The above list is not exhaustive, with the acknowledgement 340 to the requesting server (step S435). An example of the deployment information for the slave server is shown in table 3 in the following.

TABLE 3

| Option | Length | Value | Description |
|---|---|---|---|
| 100 | n | Hdfs://192.168.1.101:9000 | The location of the storage server, which is provided for the slave server(s) to store working results. |
| 101 | n | /app/hadoop/tmp | The directory of the slave server, which is provided to store temporarily files. |
| 102 | 1 | 1 | A designated number of copies being stored in the storage server. |
| 103 | n | 192.168.1.100:54311 | IP address and port number of the master server. |

When recognizing that the requesting server is the storage server (the "storage server" path of step S415), the fixed IP address for the storage server is obtained and replied to the requesting server with an offer message 320 (step S441), where the fixed IP address for the storage server may be recorded in the mapping table. Subsequently, when receiving a request 330 containing the fixed IP address of the storage server from the requesting server (step S443), the DHCP server 110 encapsulates deployment information for the storage server in an acknowledgement 340 and replies with the acknowledgement 340 to the requesting server (step S445).

Figure 5:
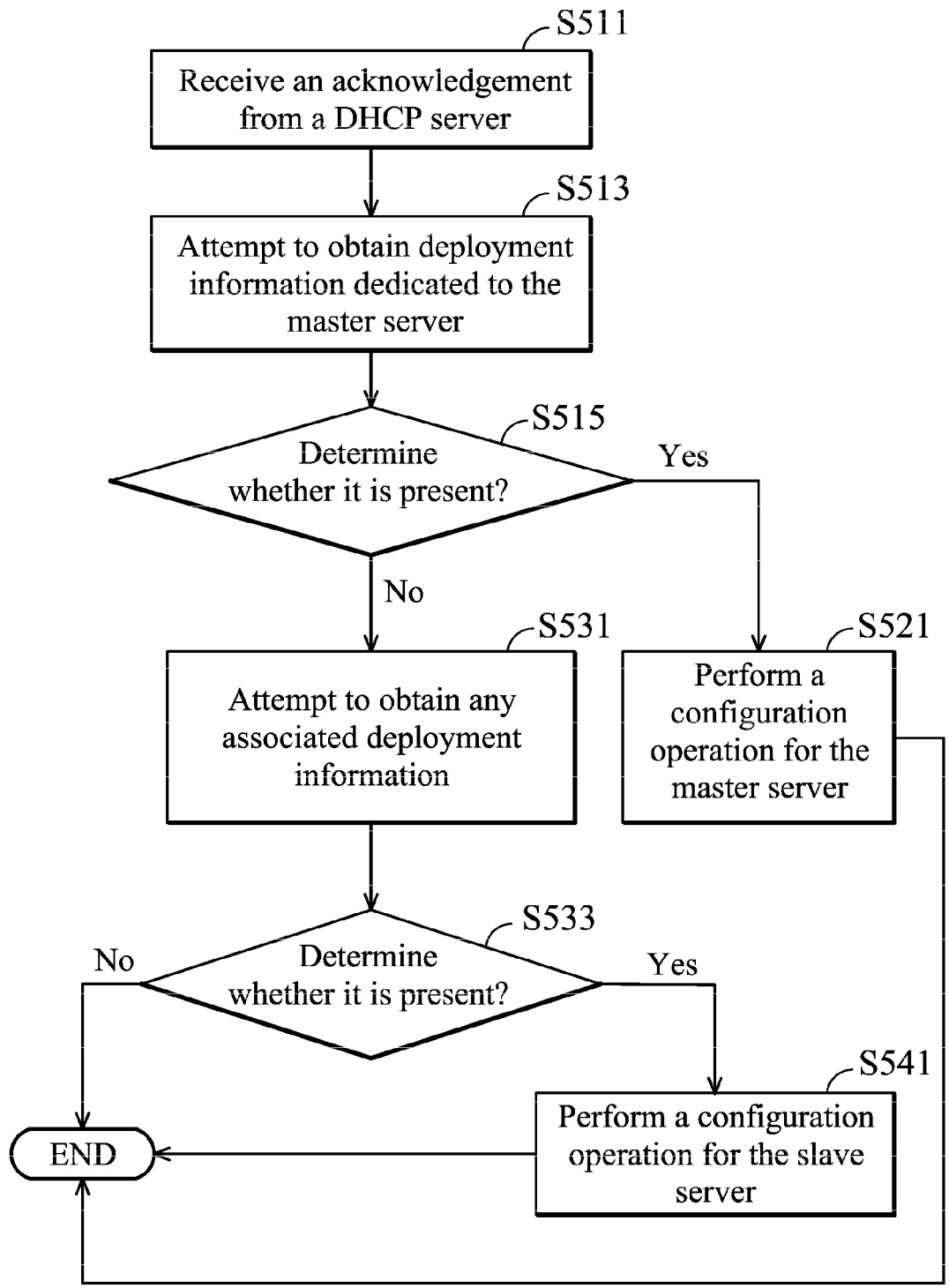
FIG. 5 is a flowchart illustrating a method for deploying clustered servers, executed in the clustered server, according to an embodiment of the invention.
Figure 6:
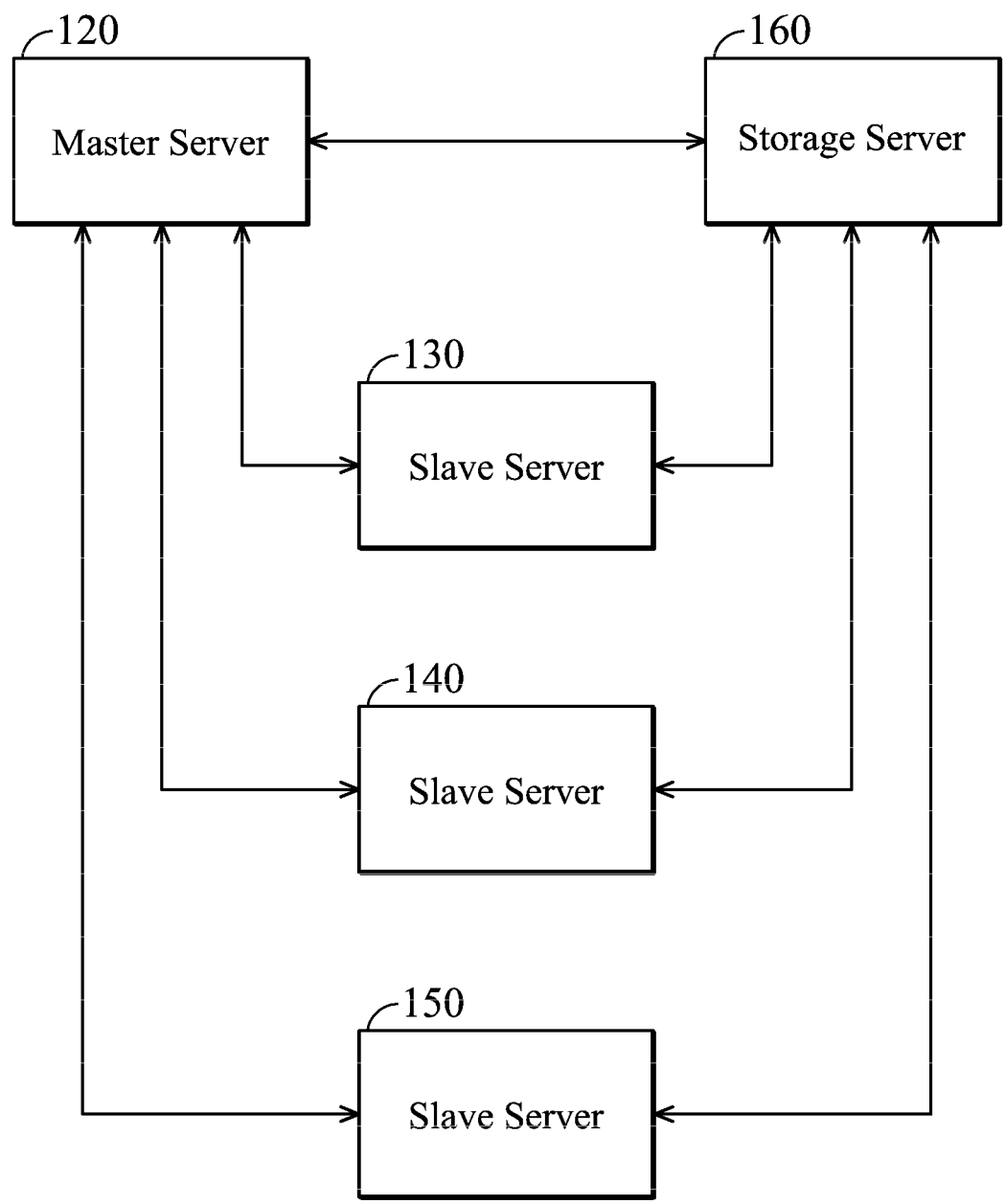
FIG. 6 is a schematic diagram illustrating the architecture of the cloud computing environment according to an embodiment of the invention.

Each of the clustered servers has no knowledge regarding its functionality in the cloud computing environment, determines to be a master server, a slave server, a storage server, or any combination thereof through the deployment information of the received acknowledgement 340, and accordingly configures itself. FIG. 5 is a flowchart illustrating a method for deploying clustered servers, executed in the clustered server, according to an embodiment of the invention. Specifically, the method is performed when the processing unit 210 of any clustered server 130, 140, 150 or 160 loads and executes relevant program codes. After receiving an acknowledgement 340 from the DHCP server 110 (step S511), any of the clustered servers 130 to 160 attempts to obtain deployment information dedicated to the master server by comprehending the option values of the acknowledgement 340 (step S513). Then, it is determined whether the deployment information dedicated to the master server is present (step S515). For example, the clustered server determines whether any value of the options "104", "105" and "106" is present. When the deployment information dedicated to the master server is present (the "Yes" path of step S515), a configuration operation for the master server is performed (step S521). During the performance of the configuration operation, the master server 120 may write the deployment information carried in the acknowledgement 340 into relevant description file(s) and executable program file(s). For example, the values of the options "100" and "101" of Table 2 are written into the description file "core-site.xml", the value of the option "102" of Table 2 is written into the description file "hdfs-site.xml", and the value of the option "103" of Table 2 is written into the description file "mapred-site.xml". The values of the options "104" to "106" of Table 2 are written into the executable program file "do.sh". When the deployment information dedicated to the master server is absent (the "No" path of step S515), the clustered server attempts to obtain any associated deployment information by comprehending the option values of the acknowledgement 340 (step S531). When any associated deployment information is present (the "Yes" path of step S533), a configuration operation for the slave server is performed (step S541); otherwise, the process ends. During the performance of the configuration operation, any of the slave servers 130 to 150 may write the deployment information carried in the acknowledgement 340 into relevant description file(s) and executable program file(s). For example, the values of the options "100" and "101" of Table 3 are written into the description file "core-site.xml", the value of the option "102" of Table 3 is written into the description file "hdfs-site.xml", and the value of the option "103" of Table 3 is written into the description file "mapred-site.xml". After the master server 120 and the slave servers 130 to 150 complete their configuration operations, the cloud computing environment is formed. FIG. 6 is a schematic diagram illustrating the architecture of the cloud computing environment according to an embodiment of the invention.

Although the embodiment has been described as having specific elements in FIG. 2, it is noted that additional elements may be included to achieve better performance without departing from the spirit of the invention. While the process flows described in FIG. 4 and FIG. 5 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for deploying clustered servers, executed by a processing unit of a DHCP (Dynamic Host Configuration Protocol) server, comprising:
   recognizing whether a type of a requesting server is master or slave in a cloud computing environment after receiving a discovery message from the requesting server;
   encapsulating deployment information associated with the type of the requesting server according to the recognition into an acknowledgement after receiving a request from the requesting server, wherein the request requests an IP (Internet Protocol) address, which has been assigned by the DHCP server; and
   replying with the acknowledgement to the requesting server, thereby enabling the requesting server to configure itself as a master server or a slave server in the cloud computing environment according to the deployment information of the acknowledgement;
   wherein the encapsulating step further comprises:
   encapsulating deployment information associated with the master server into the acknowledgement when recognizing that the type of the requesting server is master; and
   encapsulating deployment information associated with slave servers into the acknowledgement when recognizing that the type of the requesting server is slave,
   wherein the deployment information associated with the master server comprises an account and a password for logging in a storage server of the cloud computing environment, and the deployment information associated with slave servers comprises an IP address of the master server.

2. The method of claim 1, wherein the request is a DHCPREQUEST of DHCP and the acknowledgement is a DHCPACK of DHCP.

3. The method of claim 2, wherein the deployment information is encapsulated in at least one undefined option of DHCP.

4. The method of claim 3, wherein the recognition step comprises:
   obtaining a MAC (Media Access Control) address of the discovery message from the requesting server after receiving the discovery message; and recognizing that the type of the requesting server is master or slave by inspecting a mapping table, the method, before the receipt of the request, comprising:

providing a fixed IP address recorded in the mapping table as the assigned IP address and replying with an offer message comprising the fixed IP address when recognizing that the type of the requesting server is master; and reserving an IP address from an available address range as the assigned IP address and replying with an offer message comprising the reserved IP address when recognizing that the type of the requesting server is the slave.

5. The method of claim 4, wherein the discovery message is a DHCPDISCOVER of DHCP and the offer message is a DHCPOFFER of DHCP.

6. An apparatus for deploying clustered servers, comprising:

a communications interface; and a processing unit, coupled to the communications interface, recognizing whether a type of a requesting server is master or slave in a cloud computing environment after receiving a discovery message from the requesting server, encapsulating deployment information associated with the type of the requesting server according to the recognition into an acknowledgement after receiving a request from the requesting server through the communications interface, wherein the request requests an IP (Internet Protocol) address, which has been assigned by the DHCP server, and replying with the acknowledgement to the requesting server through the communications interface, thereby enabling the requesting server to configure itself as a master server or a slave server in the cloud computing environment according to the deployment information of the acknowledgement;

wherein the processing unit encapsulates deployment information associated with the master server into the acknowledgement when recognizing that the type of the requesting server is master, and encapsulates deployment information associated with the slave servers into the acknowledgement when recognizing that the type of the requesting server is slave, wherein the deployment information associated with the master server comprises an account and a password for logging in a storage server of the cloud computing environment, and the deployment information associated the slave servers comprises an IP address of the master server.

7. The apparatus of claim 6, wherein the request is a DHCPREQUEST of DHCP and the acknowledgement is a DHCPACK of DHCP.

8. The apparatus of claim 7, wherein the deployment information is encapsulated in at least one undefined option of DHCP.

9. The apparatus of claim 8, comprising:

a memory, storing a mapping table, wherein the processing unit performs the following operations in the recognition: obtaining a MAC (Media Access Control) address of the discovery message from the requesting server after receiving the discovery message through the communications interface; and recognizing that the type of the requesting server is master or slave by inspecting the mapping table, and performs the following operations before the receipt of the request: providing a fixed IP address recorded in the mapping table as the assigned IP address and replying with an offer message comprising the fixed IP address through the communications interface when recognizing that the type of the requesting server is master; and reserving an IP address from an available address range as the assigned IP address and replying with an offer message comprising the reserved IP address through the communications interface when recognizing that the type of the requesting server is slave.

10. The apparatus of claim 9, wherein the discovery message is a DHCPDISCOVER of DHCP and the offer message is a DHCPOFFER of DHCP.

11. A method for deploying clustered servers, executed by a processing unit of a server, comprising:

obtaining deployment information from an acknowledgement after receiving the acknowledgement from a DHCP (Dynamic Host Configuration Protocol) server;

configuring the server as a master server in a cloud computing environment when the deployment information of the acknowledgement comprises an account and a password for logging in a storage server of the cloud computing environment, wherein the master server divides a task into smaller sub-tasks, distributes the sub-tasks to a plurality of slave servers via the storage server, collects computation results of the sub-tasks from the storage server and combines the computation results to form an output; and configuring the server as one of the slave servers in the cloud computing environment when the deployment information of the acknowledgement comprises an IP address of the master server, wherein the slave server processes the sub-task and stores its computation result to a designated location of the storage server.

12. The method of claim 11, wherein the acknowledgement is a DHCPACK of DHCP.

13. The method of claim 12, wherein the deployment information is encapsulated in at least one undefined option of DHCP.

\* \* \* \* \*